United States Patent
Li et al.

(10) Patent No.: US 10,996,637 B2
(45) Date of Patent: *May 4, 2021

(54) WELLBORE NON-RETRIEVAL SENSING SYSTEM

(71) Applicant: Saudi Arabian Oil Company, Dhahran (SA)

(72) Inventors: Bodong Li, Dhahran (SA); Chinthaka Pasan Gooneratne, Dhahran (SA); Shaohua Zhou, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,267

(22) Filed: Dec. 19, 2019

(65) Prior Publication Data

US 2020/0125040 A1 Apr. 23, 2020

Related U.S. Application Data

(63) Continuation of application No. 16/406,257, filed on May 8, 2019, now Pat. No. 10,551,800, which is a
(Continued)

(51) Int. Cl.
*E21B 47/024* (2006.01)
*E21B 47/12* (2012.01)
(Continued)

(52) U.S. Cl.
CPC ............ *G05B 11/01* (2013.01); *E21B 47/024* (2013.01); *E21B 47/26* (2020.05); *G05B 15/02* (2013.01)

(58) Field of Classification Search
CPC ..... E21B 47/024; E21B 47/124; G05B 11/01; G05B 15/02
See application file for complete search history.

(56) References Cited

U.S. PATENT DOCUMENTS

| | | |
|---|---|---|
| 5,278,550 A | 1/1994 | Rhein-Knudsen et al. |
| 6,443,228 B1 | 9/2002 | Aronstam |

(Continued)

FOREIGN PATENT DOCUMENTS

| | | |
|---|---|---|
| WO | 2010105177 | 9/2010 |
| WO | 142622 | 6/2011 |

(Continued)

OTHER PUBLICATIONS

International Search Report and Written Opinion issued in International Application No. PCT/US2018/052555 dated Dec. 13, 2018, 15 pages.

(Continued)

*Primary Examiner* — Daniel P Stephenson
(74) *Attorney, Agent, or Firm* — Fish & Richardson P.C.

(57) ABSTRACT

A system includes at least one hardware processor interoperably coupled with computer memory and configured to perform operations of one or more components of the computer-implemented system. The system includes a detachable module (DM) delivery system configured to deploy, from release grooves of the NRSS and during a survey of the NRSS inside a wellbore during drilling of a well, plural DMs into an environment surrounding the NRSS, wherein the plural DMs are pre-loaded into the NRSS, and plural DMs are configured to gather and store sensing data from the environment.

20 Claims, 11 Drawing Sheets

Related U.S. Application Data continuation of application No. 15/720,297, filed on Sep. 29, 2017, now Pat. No. 10,394,193.

(51) Int. Cl.
  *G05B 11/01* (2006.01)
  *G05B 15/02* (2006.01)
  *E21B 47/26* (2012.01)

(56) References Cited

U.S. PATENT DOCUMENTS

| | | |
|---|---|---|
| 6,761,230 B2 | 7/2004 | Cross et al. |
| 6,895,678 B2 | 5/2005 | Ash et al. |
| 6,912,177 B2 | 6/2005 | Smith |
| 6,971,265 B1 | 12/2005 | Sheppard et al. |
| 7,650,269 B2 | 1/2010 | Rodney |
| 7,730,625 B2 | 6/2010 | Blake |
| 9,250,339 B2 | 2/2016 | Ramirez |
| 9,494,032 B2 | 11/2016 | Roberson et al. |
| 9,739,141 B2 | 8/2017 | Zeng et al. |
| 10,394,193 B2 | 8/2019 | Li et al. |
| 10,551,800 B2 * | 2/2020 | Li .......................... G05B 15/02 |
| 2008/0007421 A1 | 1/2008 | Liu et al. |
| 2012/0132418 A1 | 5/2012 | McClung |
| 2012/0173196 A1 | 7/2012 | Miszewski |
| 2013/0125642 A1 | 5/2013 | Parfitt |
| 2014/0375468 A1 | 12/2014 | Wilkinson et al. |
| 2016/0115783 A1 | 4/2016 | Zeng et al. |
| 2017/0350241 A1 | 12/2017 | Shi |
| 2019/0101872 A1 | 4/2019 | Li |
| 2019/0227499 A1 | 7/2019 | Li et al. |
| 2020/0125040 A1 * | 4/2020 | Li ............................ E21B 47/26 |

FOREIGN PATENT DOCUMENTS

| | | |
|---|---|---|
| WO | 2013016095 | 1/2013 |
| WO | 2013148510 | 10/2013 |

OTHER PUBLICATIONS

GCC Examination Report in GC 2018-36113, dated Dec. 13, 2020, 4 pages.

* cited by examiner

US 10,996,637 B2

WELLBORE NON-RETRIEVAL SENSING SYSTEM

CROSS-REFERENCE TO RELATED PATENT APPLICATIONS

This application is a continuation of and claims the benefit of priority to U.S. patent application Ser. No. 16/406,257, filed May 8, 2019, which is a continuation of and claims the benefit of priority to U.S. application Ser. No. 15/720,297 (now U.S. Pat. No. 10,394,193), filed Sep. 29, 2017, the contents of each of which is incorporated herein by reference.

BACKGROUND

Various types of survey tools can be used in onshore/offshore oil and gas wells. For example, gyro survey tools can be used for verticality checking and directional plan tie-in in shallow hole sections. Also, measurement while drilling (MWD) tools can be used for vertical performance drilling and directional drilling in deep hole sections. For some deep but low-demand survey applications such as performance drilling with deep kick-off points and gyro survey tie-in at deep locations, retrievable survey tools can be inefficient due to an excessive amount of time required for retrieval. Further, real-time survey tools, such as MWD and gyro while drilling (GWD) tools, can be costly.

SUMMARY

The present disclosure describes a system for surveying a wellbore with a non-retrieval sensing system (NRSS).

In an implementation, a computer-implemented system comprises: a non-retrieval sensing system (NRSS) comprising: at least one hardware processor interoperably coupled with computer memory and configured to perform operations of one or more components of the computer-implemented system; and a detachable module (DM) delivery system configured to deploy, from release grooves of the NRSS and during a survey of the NRSS inside a wellbore during drilling of a well, plural DMs into an environment surrounding the NRSS, wherein the plural DMs are preloaded into the NRSS; and plural DMs configured to gather and store sensing data from the environment.

The previously described implementation is implementable using mechanical components in combination with the following: a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the NRSS can provide a lower cost compared to the real-time systems. Second, the NRSS can provide a lower running cost compared to retrievable survey tools, for example, eliminating non-drilling time needed for tool retrieval. Third, the NRSS can provide lower costs in the areas of functionality, operation time, and well cost. Fourth, the NRSS can carry large data storage space for acquisition of high-resolution downhole data. Fifth, the data transfer can be triggered automatically by downhole events or preset time delays. Sixth, depending on downhole conditions, the recorded downhole information can be transferred via the flow channel of annulus or drill pipe. Other advantages will be apparent to those of ordinary skill in the art.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1B:
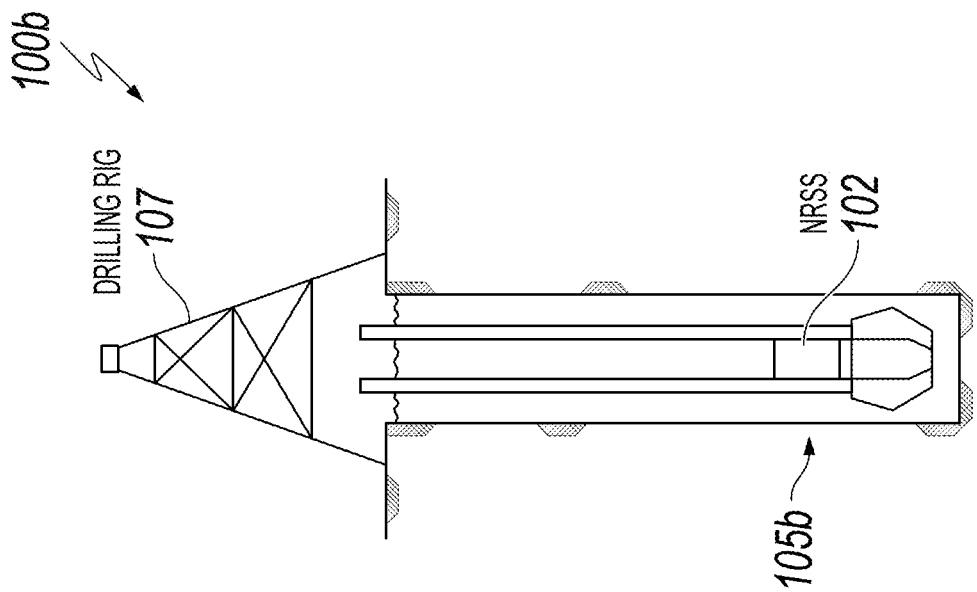
FIGS. 1A-1D are cross-sectional schematics of an example drilling system, according to an implementation of the present disclosure.
Figure 1A:
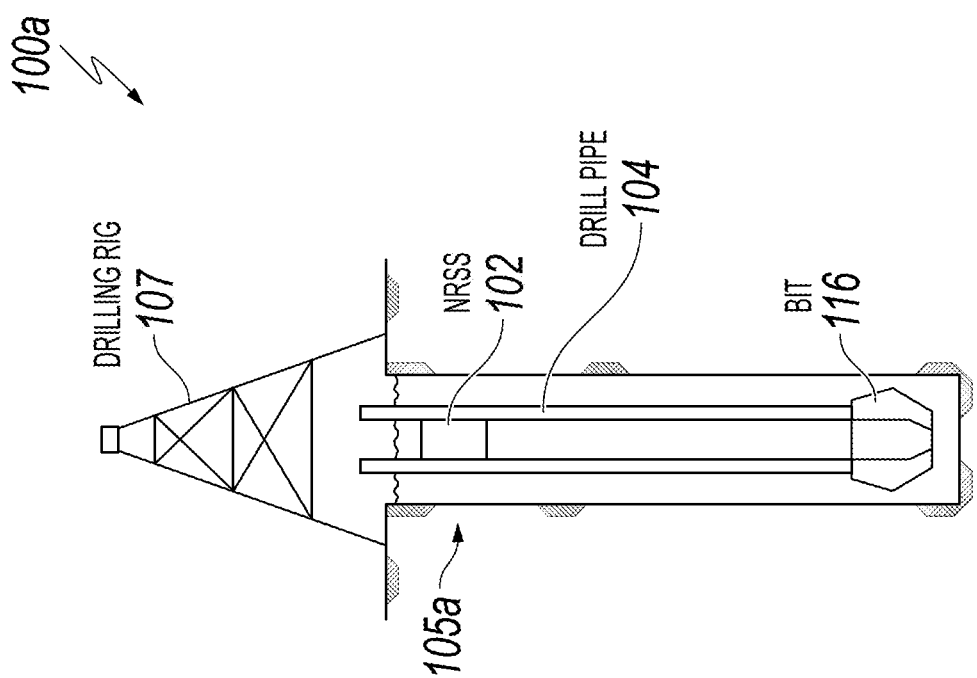

The following detailed description describes a system for surveying a wellbore with a non-retrieval sensing system, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A non-retrieval sensing system (NRSS) is disclosed with features integrated sensors for downhole surveys as well as other in-situ environment evaluation and characterization.

The NRSS includes detachable modules (DMs) that store sensing data. When the NRSS reaches a designated location, for example, a DM can be released from the NRSS, allowing the sensing data to be transferred to the surface while the NRSS remains downhole. The DM can be a compact and battery-less device capable of withstanding extreme downhole conditions such as high temperature, high pressure, and other conditions. The battery-less feature of the DM can also make the DM both low-cost and maintenance-free. The NRSS can have advantages over other technologies such as measurement while drilling (MWD) and gyro while drilling (GWD) tools, with respect to functionality, operation time, and well cost. Both mechanical and motorized DM release systems can be designed and manufactured for running the NRSS in different applications.

A wellbore survey, also commonly known as a survey or directional survey, is a practice of making a detailed record of the shape of the borehole for plotting a 3D trajectory of a wellbore during or after drilling. A wellbore survey can provide vital information for the drilling operations to follow the planned path. For example, a deviation from an actual plan may cause serious consequences such as missing a target and having collisions with nearby offset wells. In another example, a deviation from an actual plan can result in a legal challenge, such as if the wellbore penetrates a formation that is beyond the boundary permitted under a government lease.

Typical survey tools include TOTCO, wireline survey, Gyro, MWD, and GWD. The most basic survey tool is TOTCO, a mechanical device that measures and records the inclination angle at the bottom hole but not the azimuth. The tool can either be run on a wire to the bottom hole assembly (BHA) and recovered as soon as the survey is taken, or the tool can be dropped down through the drill string when the drill string is tripped out and then recovered when the BHA is at the surface. A clockwork timer in the TOTCO can determine when the survey is taken. The survey can be recorded by punching a hole in a paper disk. As a low-cost survey tool with limited functionalities, this single-shot device is mostly used for confirming the verticality of the drilled shallow holes to avoid or prevent accidental kick-off.

Wireline survey and gyro survey tools, on the other hand, can provide accurate and comprehensive multi-shot surveys measured by gyroscopes and accelerometers. With a similar sensing principle, the tools can be mainly differentiated by their running and retrieving methods. During the operation, the wireline survey tool can be lowered into the wellbore and retrieved by a wireline. The gyro survey tool, on the other hand, can be dropped inside the drill pipe and retrieved while tripping out. Both of the tools can require a significant amount of time for running and retrieval, not to mention the additional time and effort required for rigging up the wireline in the case of wireline survey. Moreover, running surveys on wireline can carry a risk as the tool can get stuck downhole. Therefore, although wireline survey and gyro survey provide accurate measurement, the surveys are not considered as time/cost-efficient solutions, and certainly not ideal for deep-well applications.

MWD tools can provide a real-time sensing and communication system that can take magnetic-field-based surveys in deep wells. The system can utilize mud pulse telemetry to send modulated mud pressure signals to the surface through the drilling mud along the inside of drill pipe. At each survey point, the orientation of the MWD can be determined by measuring the gravity and earth magnetic field. Any magnetic interference or noise can affect the accuracy of the tool, which makes MWD only suitable for open-hole survey jobs where stray magnetic fields do not exist. In real-world applications, MWD can be used to obtain open-hole surveys in deep-hole sections, and the result is tied in with cased-hole surveys measured by wireline survey or gyro survey tools in shallower sections. MWD is expensive to run, and drilling BHA has to be tripped out in the event that the tool fails downhole.

An alternative solution for deep-well surveys is GWD which utilizes a gyroscope instead of magnetometer to determine the orientation. Therefore, the stray magnetic field from the casing does not provide interference on the tool, and the tool can be operated both inside and outside of the casing. During the job, the measured survey data of GWD can also be transferred to the surface using mud pulse telemetry.

In shallow holes sections, retrievable survey tools are commonly used due to their simplicity and low retrieval cost. Real-time survey tools are mostly used for directional drilling, where there is a high demand on the number of survey points and operation depth. For deep but low-demand applications, such as performance drilling with deep kick-off points and gyro survey tie-in at deep locations, retrievable survey tools can become inefficient and real-time survey tools can become costly and unnecessary.

The NRSS can provide capabilities of taking measurements and transferring the data to the surface without the need of retrieving the tool itself. The NRSS can eliminate retrieval time, especially for deep wells, and can avoid using complex and expensive real-time communication systems. The NRSS can also be suitable for low-demand, deep-well survey applications. None, some, or all of the features of the previously mentioned technologies can be used or combined with the NRSS.

Figure 1D:
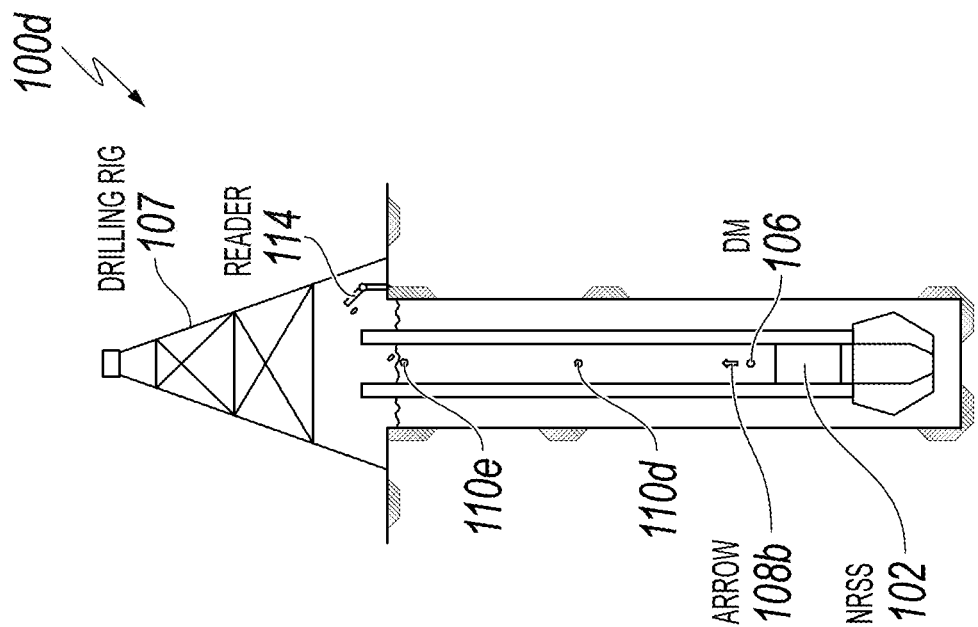
Figure 1C:
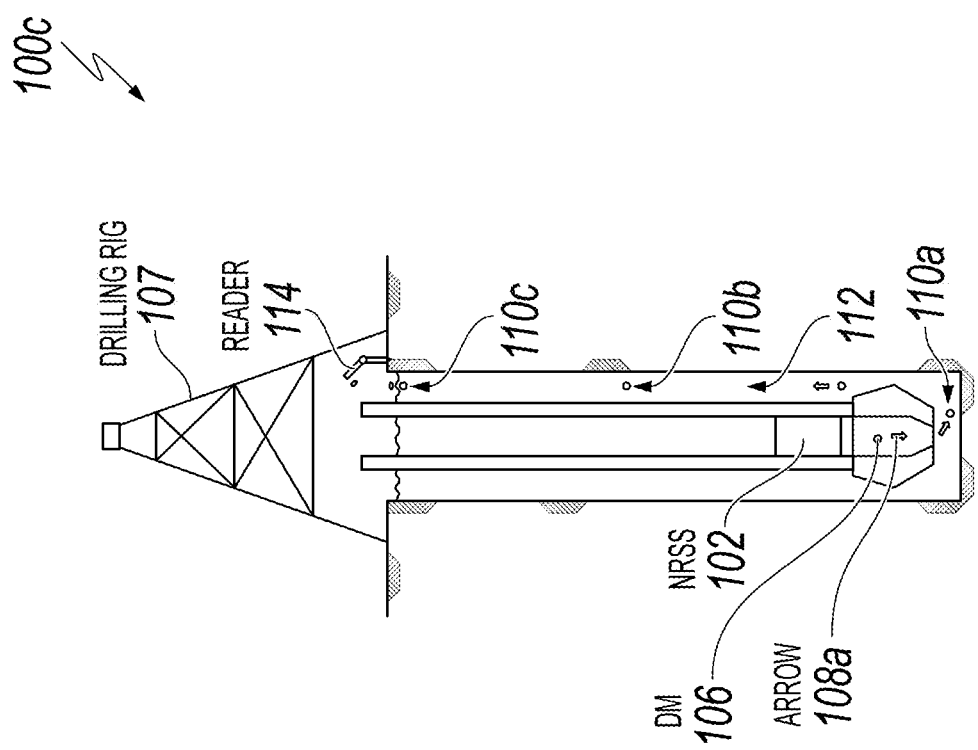

FIGS. 1A-1D are cross-sectional schematics of an example drilling system 100, according to an implementation of the present disclosure. For example, the drilling system 100 includes an NRSS 102 that can be deployed when drilling in a drill pipe 104 for a drilling rig 107. The NRSS 102 can be equipped with a gyroscope, a magnetometer, an accelerometer, and other integrated sensors for downhole surveys and in-situ environment evaluation and characterization. Other integrated sensors can include, for example, temperature sensors, pressure sensors, gamma ray sensors, acoustic sensors, spectroscopic sensors, chemical sensors, and Potential of Hydrogen (PH) sensors. The NRSS 102 can include detachable modules (DMs) 106 that store sensing data. Each DM 106 can be a compact and batteryless device that is capable of withstanding extreme downhole conditions, including high temperature and high pressure. During operation, the NRSS 102 can be dropped from the top of the drill pipe 104, initially at a position 105a, and can move downward with the mud flow while taking measurements inside the drill pipe 104. When the NRSS 102 reaches a designated location 105b, for example, data can be transferred from the NRSS 102 to the DMs 106. Then, DMs 106 can be released from the NRSS 102, allowing the sensing data to be transferred to the surface while the NRSS 102 remains downhole. The direction of travel of the DMs 106 can depend on the direction of the downhole circulation. For example, the DMs 106 can flow in a downward direction indicated by an arrow 108a, and then sequentially through positions 110a-110c inside an annulus 112, as shown in FIG. 1C. In another example, such as in case of a total loss of circulation or an inability to circulate through the open hole, the DMs 106 can flow in a direction indicated by an arrow 108b, and continue to positions 110d through 110e inside the drill pipe 104, as shown in FIG. 1D. The time it takes for the DM to reach the surface can depend on a speed of circulation as well as wellbore and mud properties and conditions. A reader 114 at the surface can download data from the DMs 106 and can complete the survey job. Alternatively, the DMs 106 can be retrieved at the surface, and the data can be downloaded offline.

In some implementations, in addition to, or instead of, the deployment method described above, the NRSS 102 can be placed inside the drill pipe 104 above a bit 116 and can run in a hole with the drill pipe. In this case, the NRSS 102 can take the measurements and release DMs 106 at certain times and/or depth intervals. After the job, the NRSS 102 can be retrieved with the BHA while tripping out.

The NRSS 102 can have a pipe-shaped design that, during drilling, allows fluid to flow through the center. The NRSS 102 can include batteries, a motherboard with sensors and a microcontroller, a DM release mechanism, and other components. In some implementations, the batteries can be rechargeable batteries such as Li-Ion, Li-Polymer, NiMH, AgZn, or other types, or non-rechargeable batteries such as Zn—C, Zn—Mg, Mg, or other types. In some implementations, the microcontrollers can be advanced reduced instruction set computer (RISC) machine (ARM) core processors, Alf and Vegard's RISC processor (AVR), Intel Quark, Intel Atom, Intel 8051, or other processers. In some implementations, the sensors can include micro-electro-mechanical system (MEMS)-based gyroscopes, accelerometers, magnetometers, temperature sensors, and pressure sensors. The batteries can power the microcontroller, the sensors, and the motorized DM release system. The DM release system can include motor driver modules and motors. The DM release mechanism can be either mechanically actuated or motorized.

Since the stored sensing data is retrieved using DMs 106, the NRSS 102 only need to be retrieved with the drill pipe 104. The retrieval of the DMs 106 however, can be either mud flow-based or buoyancy-based, depending on the wellbore situation. In the first case, DMs 106 can be designed with a similar density as the mud fluid. After release, the DMs 106 can flow with the mud and then recovered either in the annulus or in the drill pipe, depending on the direction of the mud flow. In the lateral case, DMs 106 can be designed with a density less than the mud. After release, the DMs 106 can flow in the direction of the buoyancy force and recovered inside the drill pipe 104.

The movement of the NRSS need not be completely gravity-based, as movement can also partially be driven by the mud flow towards the bottom hole. A detachable module can be included with the NRSS 102 that further reduces the inner diameter (clearance) of the NRSS 102. The reduction of the clearance can enhance the differential hydraulic force applied on the tool along the mud flow direction. The detachable module can be used in horizontal well deployments where the gravity of the NRSS 102 is not sufficient to move the tool to the BHA.

In some implementations, the outside dimension (OD) of the NRSS 102 can be slightly smaller than the inside dimension (ID) of the drill pipe. For example, for a NRSS system that is compatible with a 4" drill pipe, the OD of the NRSS can be, for example, less than 3.34" (or 85 mm). In some implementations, the OD of a DM 106 can be, for example, between 3 and 10 mm.

Figure 2A:
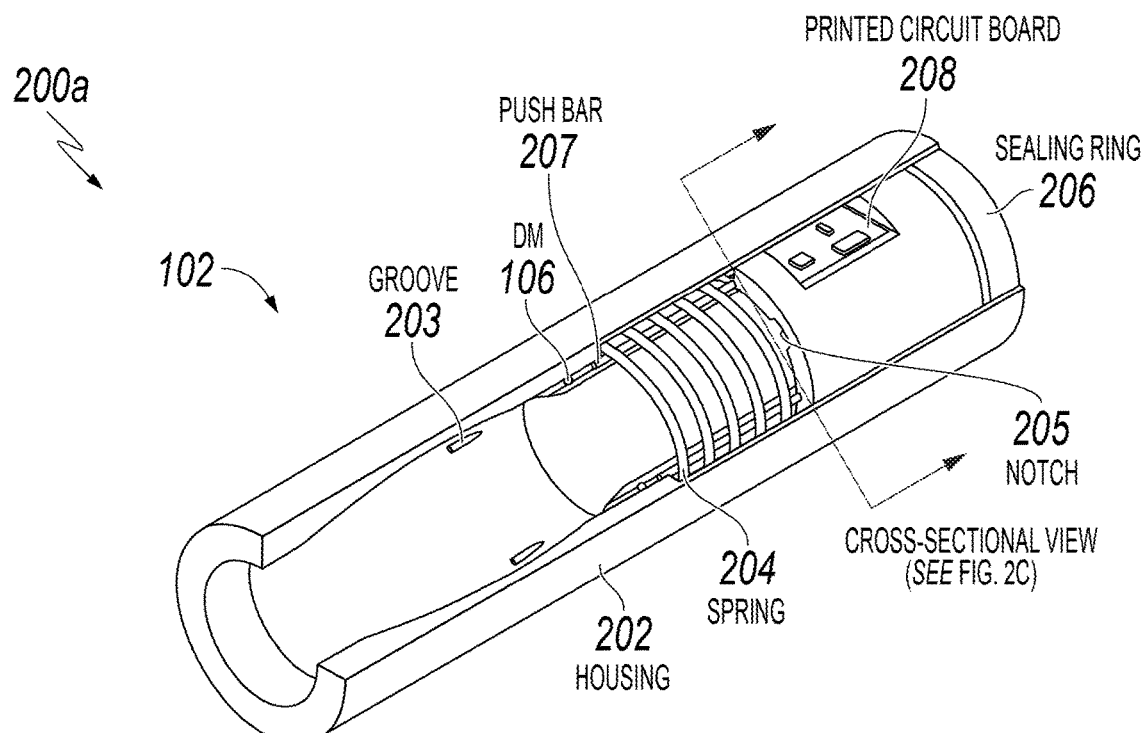
FIGS. 2A and 2B collectively show a non-retrieval sensing system (NRSS) with a mechanical detachable module (DM) release system, according to an implementation of the present disclosure.
Figure 2B:
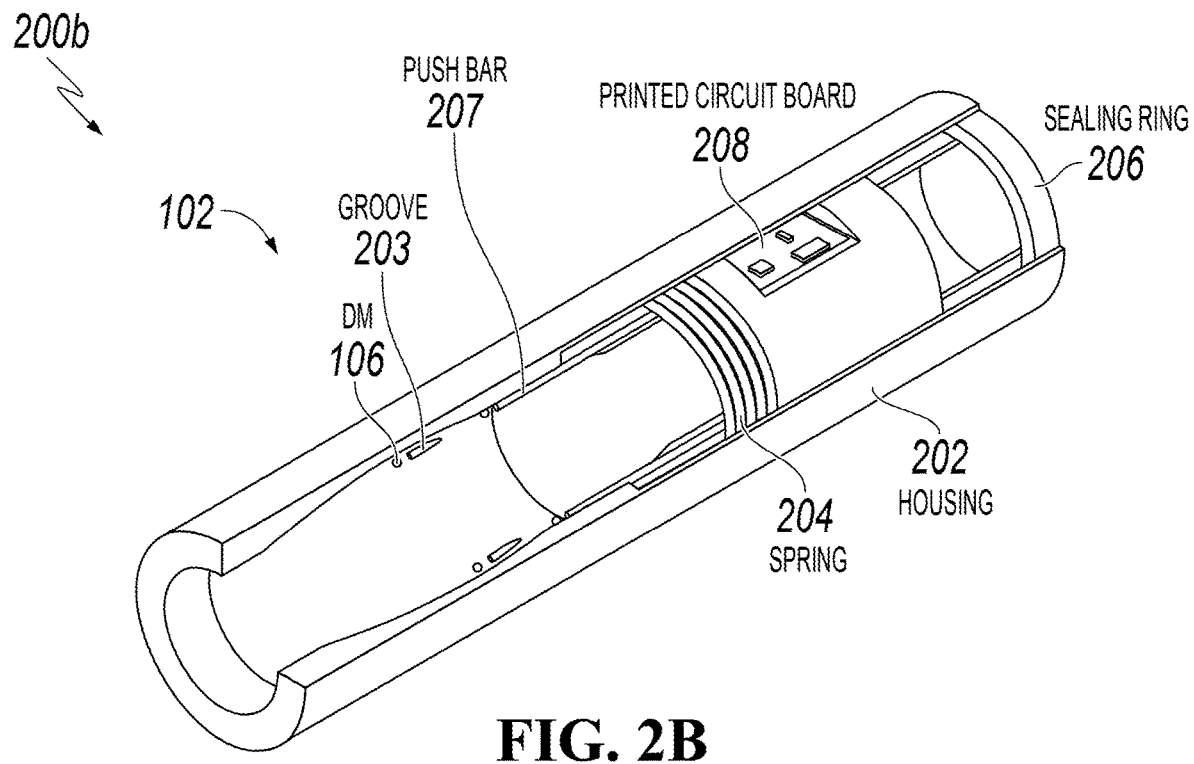

FIGS. 2A and 2B collectively show a NRSS 102 with a mechanical DM release system, according to an implementation of the present disclosure. A number of through grooves 203 (release grooves) are manufactured in the longitudinal direction on a housing 202 of the NRSS 102. Each of the grooves is assembled with a push bar 207 which is coupled to the ring-shape inner slider (for example, manufactured as a part of or attached to) with motherboard (for example, a printed circuit board 208) with batteries. The inner slider can move in a restricted area along the axis of the NRSS 102. A spring 204 is installed on the push bar 207 inside the housing 202 as a shock absorber. Before the deployment, DMs 106 are pre-installed in the grooves. After the deployment, when the housing 202 touches the bottom of the drill pipe 104, the inner slider moves downwards on its inertia, compresses the spring 204 and pushes the DMs 106 out of the end of the grooves using the push bars 207. The mechanical DM release system relies on its own motion without introducing any additional actuators for DM release, keeping the system less complex and more energy efficient. A sealing ring 206 seals the NRSS 102. The central cavity of the NRSS 102 is typically left open for fluid to flow through. Multiple DMs 106 can be lined up and stored in each of multiple grooves in the NRSS 102 to increase DM 106 storage capacity.

Figure 2C:
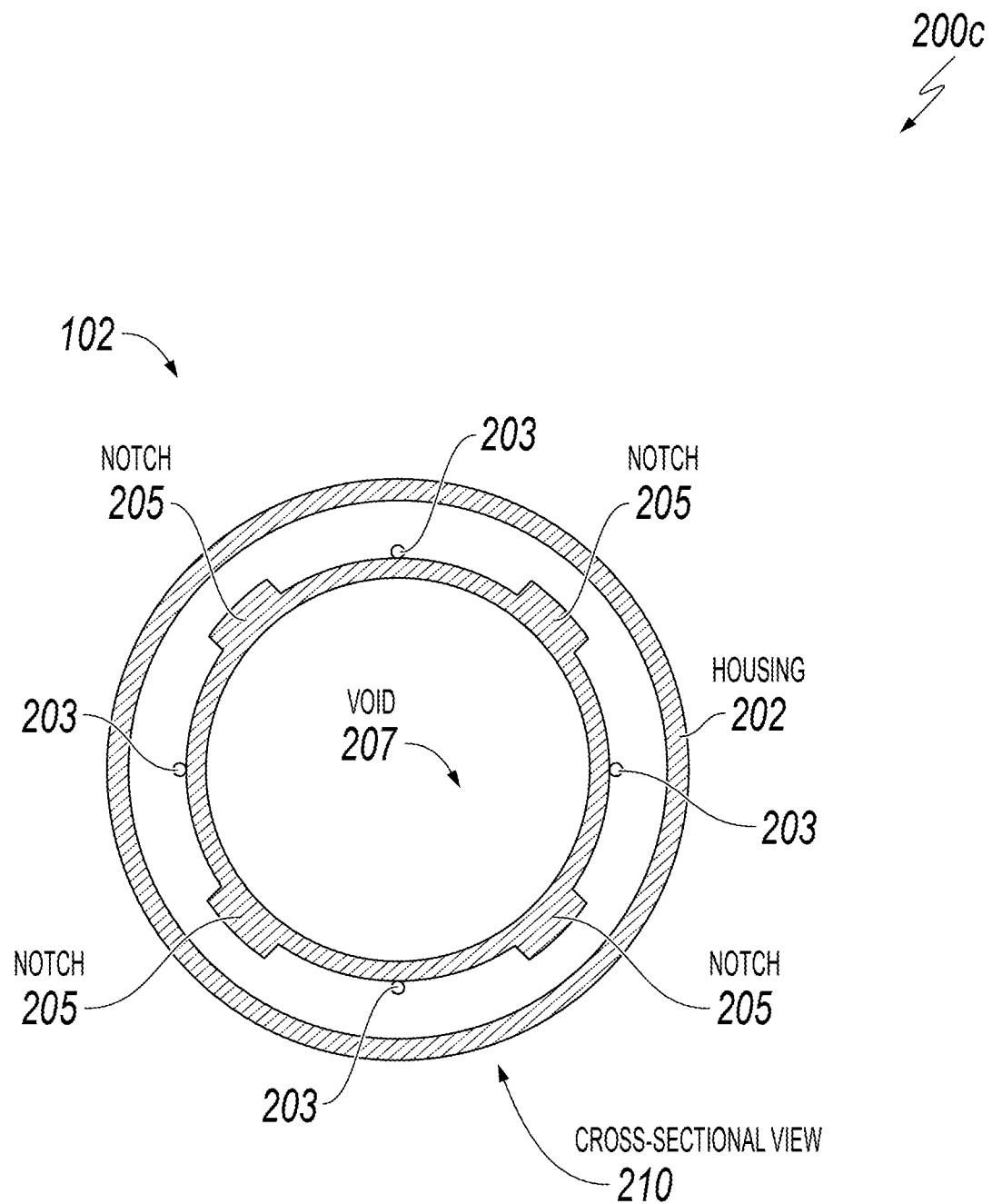
FIG. 2C shows a cross-sectional view of the NRSS, according to an implementation of the present disclosure.
Figure 3A:
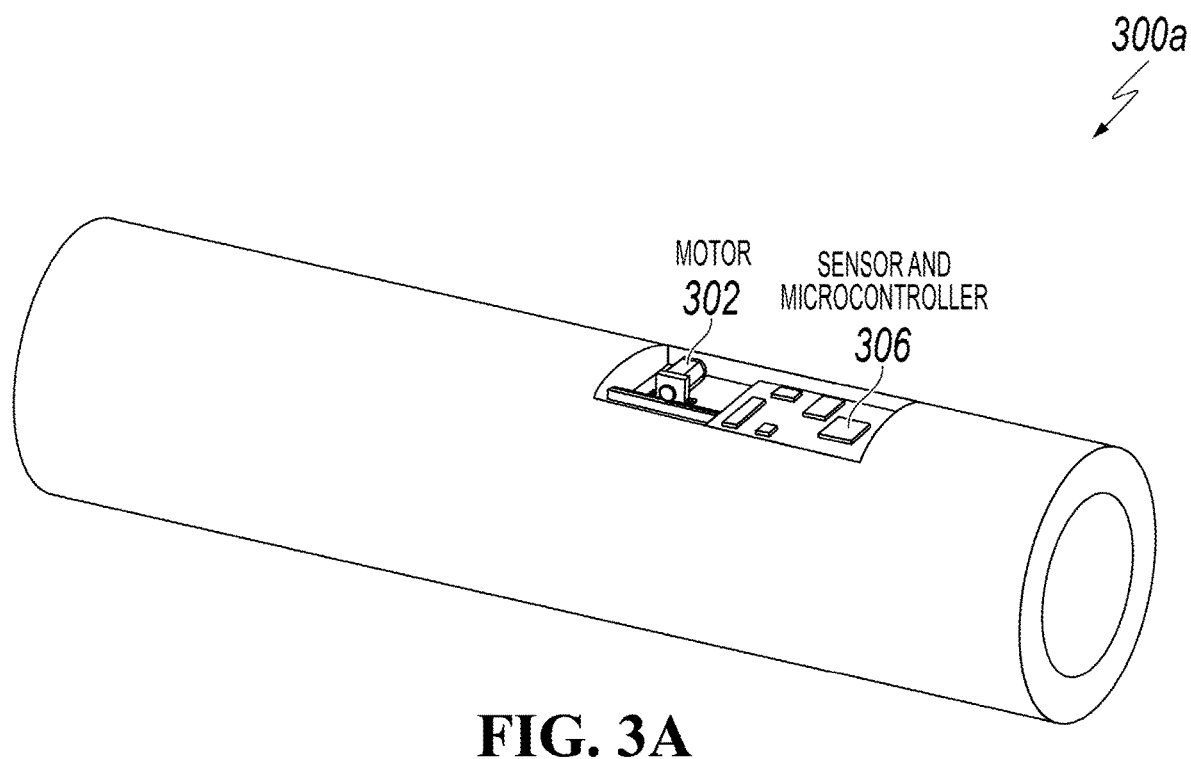
FIGS. 3A, 3B, 4A, and 4B collectively show the NRSS with an example motor, according to an implementation of the present disclosure.
Figure 3B:
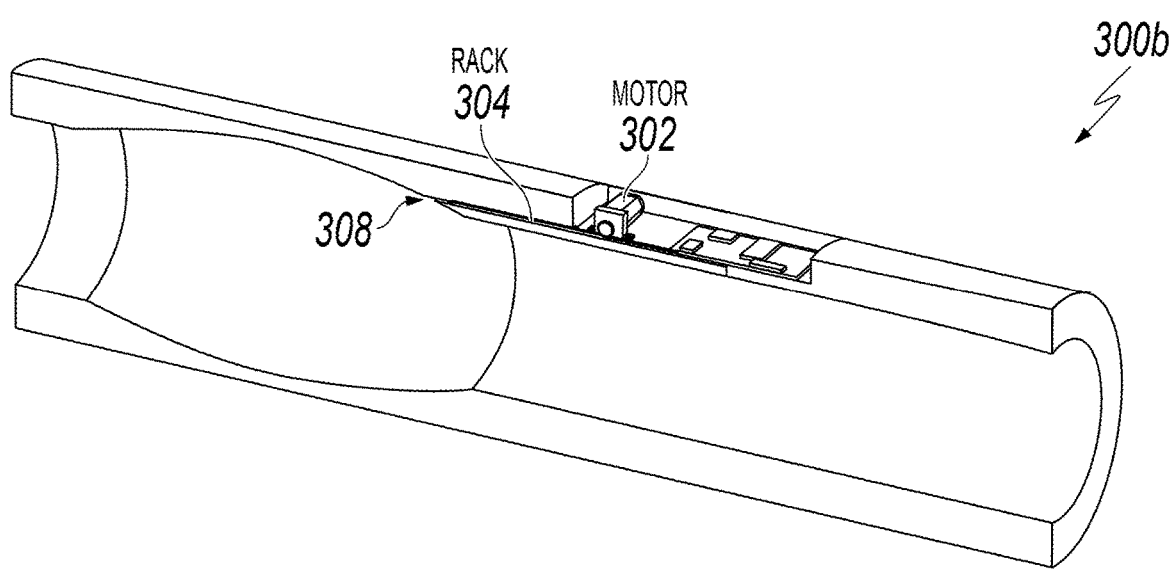

FIG. 2C shows a cross-sectional view 210 of the NRSS 102, according to an implementation of the present disclosure. In this view, alternate ones of notches 205 in the housing 202 can house, for example, slots for the DMs 106 and components attached to the spring 204 for deploying the DMs 106. A void 207 in the NRSS 102 provides the central fluid flow path for the flow of fluid and mud through the NRSS 102.

The cross-sectional view 210 shows four grooves 203 (as previously described) from which DMs 106 are ejected. In other implementations, the number of grooves 203 can vary from 3 to 10. The number of DMs 106 stored in each groove/channel can vary from 1 to 10 or more. The orientation of each of the grooves is parallel to the central axis of the NRSS 102. In mechanical spring-loaded NRSS 102 implementations, push bars 207 for deploying DMs 106 can be synchronized as they are assembled on one inner slider. In implementations using a motorized NRSS 102, one or more push bars 207 can be driven by each motor, making it possible to release DMs 106 in one go or in different batches.

Figure 4A:
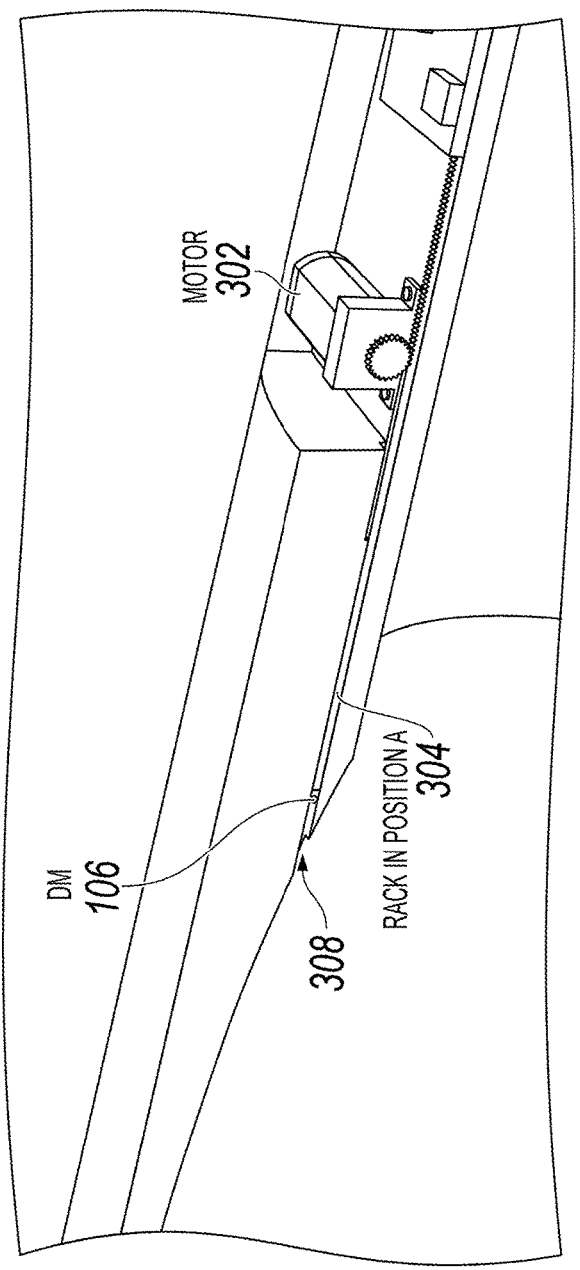
Figure 4B:
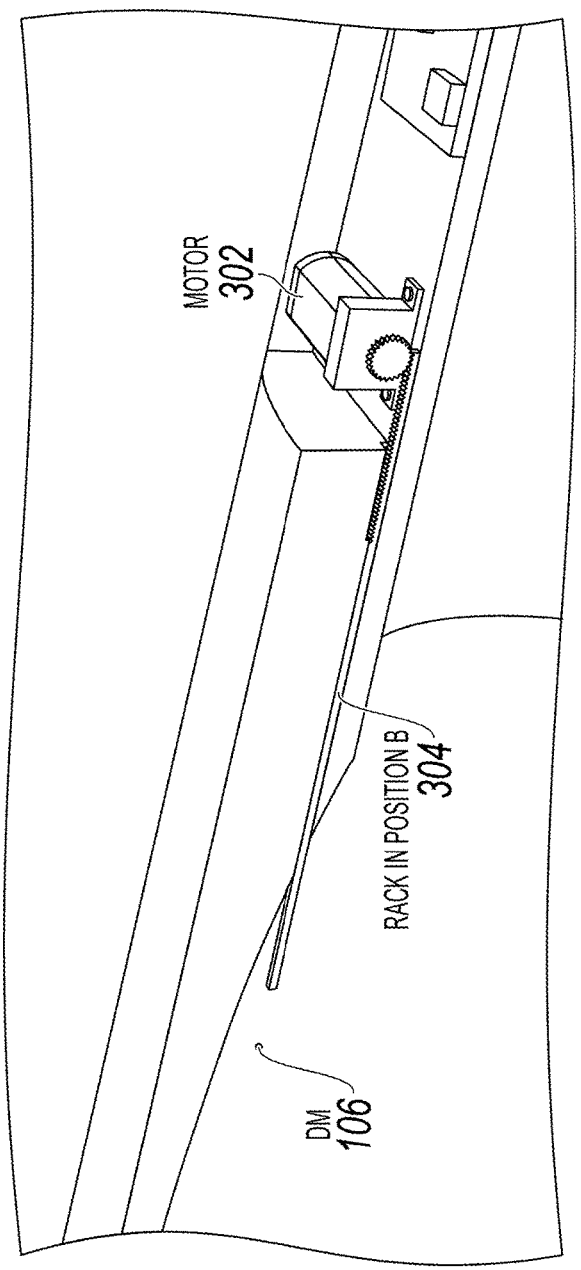

FIGS. 3A, 3B, 4A, and 4B collectively show the NRSS 102 with an example motor 302, according to an implementation of the present disclosure. Instead of having an inner slider to release the DMs mechanically, the NRSS 102 can be equipped with racks 304 and motors 302. The rack 304 can serve as a push bar 207 with its position accurately controlled by the motor 302. Before the deployment, DMs 106 are pre-installed in grooves 308 with racks 304 in position A. After the deployment of the NRSS 102, when the DMs 106 are ready to release, the motors 302 drive the racks 304, moving from position A to position B and pushing the DMs 106 out of the grooves 308. Release of the DMs 106 can be facilitated by a sensor and controller 306. As such, FIG. 4A shows the motorized design before releasing the DM 106, and FIG. 4B shows the motorized design after releasing the DM 106. Compared to the mechanical DM release system, the motorized DM release system can allow the NRSS 102 to have better controls on the DM 106 release time and method. Controlled numbers of the DMs 106 can be released at any designated time or tool position during the deployment. This gives the system more flexibility in different applications. In some mechanical release implementations of the NRSS 102, DMs 106 can be released only at the moment when NRSS 102 reaches the bottom. In motorized implementations, the DMs 106 can be released at pre-determined time or based on external triggering signals obtained from on-board sensors such as temperature, pressure, accelerometer, gyroscope, magnetic field, gamma ray, acoustic signal, spectroscopic signal, chemical concentration, PH value, etc.

Figure 5:
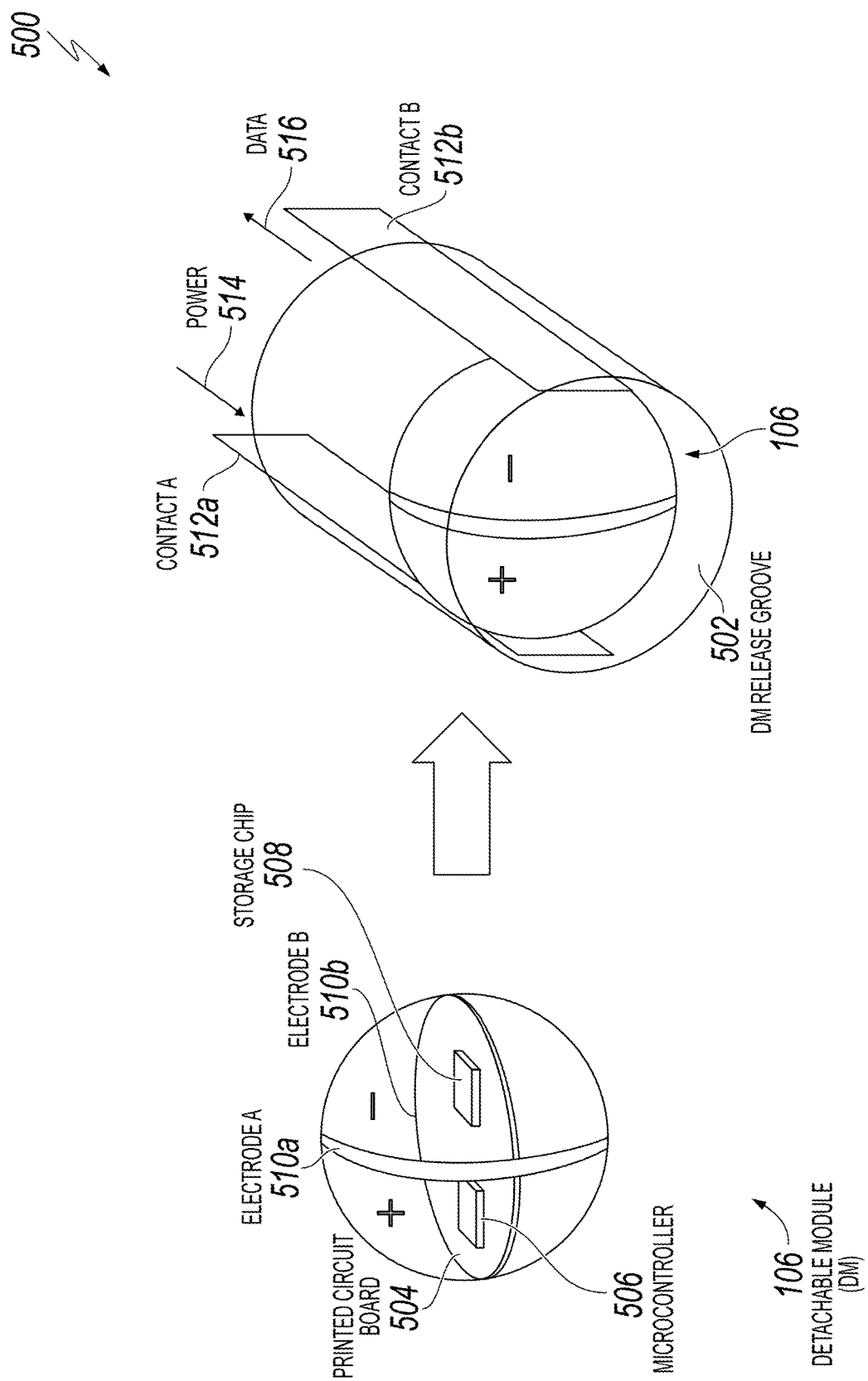
FIG. 5 shows an example of a DM 106 and a DM release groove, according to an implementation of the present disclosure.

FIG. 5 shows an example of a DM 106 and a DM release groove 502 (for example, groove 203), according to an implementation of the present disclosure. The DM release groove 502 shows a magnified view of the grooves 203 and 308, for example. The DM 106 is a spherical-shaped device with a small printed circuit board (PCB) 504 in the center covered by epoxy of good mechanical properties. The PCB 504 includes components such as a microcontroller 506 for data communication and a storage chip 508 for saving the survey data. A pair of semi-spherical metal contacts (for example, electrodes 510a and 510b) cover the DM 106 and serve as communication and power (514) ports. When the DM 106 is installed in the DM release groove 502, the PCB 504 of the DM 106 is connected to the NRSS 102 through the electrodes 510a, 510b, and metal contacts 512a and 512b. Therefore, the DM 106 is powered (514) by the DM release groove 502 where the survey data (516) is also transferred. In addition to the spherical shape of the DM 106 shown in FIG. 5, DMs 106 can have cylindrical, ellipsoid, and capsule shapes. In some implementations, DMs 106 can be equipped with on-board sensors and batteries that enable wellbore sensing after being released from the NRSS 102. The metal contacts 512a and 512b can be installed in the DM release groove 502 and embedded in the housing. For mechanical spring-type NRSS implementations, electrical lines in the housing can be connected to the printed circuit board on the inner slider through electrical contacts/brushes between the housing 202 and push bars 207. For motorized NRSS implementations, the electrical lines in the housing can be directed connected to the printed circuit board as there is no moving part in between.

DMs 106 are pre-installed and secured in the DM release grooves 502 within the body of the NRSS 102, separate from the central fluid flow path. After being released, the DMs 106 are pushed into the central flow path. Due to the fact that DMs 106 are much smaller in size compared to the inner diameter of the NRSS 102, there is no chance for the DMs 106 to block the fluid flow. Once the DMs 106 are installed, a rigid mechanical and electrical contact is established between the DMs 106 and electrodes. The quality of the contact can be optimized by tolerances of the groove design.

Both mechanical and motorized DM release systems can be designed and manufactured for running the NRSS in different applications. In one example applications, DMs can be released based on a time delay, and a motorized NRSS can release DMs based on preset timers to provide timely updates to the survey and logging. In another example applications, DMs can be released based on information captured by on-board sensors of NRSS, such as inclination (for example, using a survey sensor), formation tops (for example, using a gamma ray sensor), temperature, pressure, PH, and/or other sensors that provide the NRSS the ability to customize the DM release strategy in a case-by-case fashion.

Figure 6:
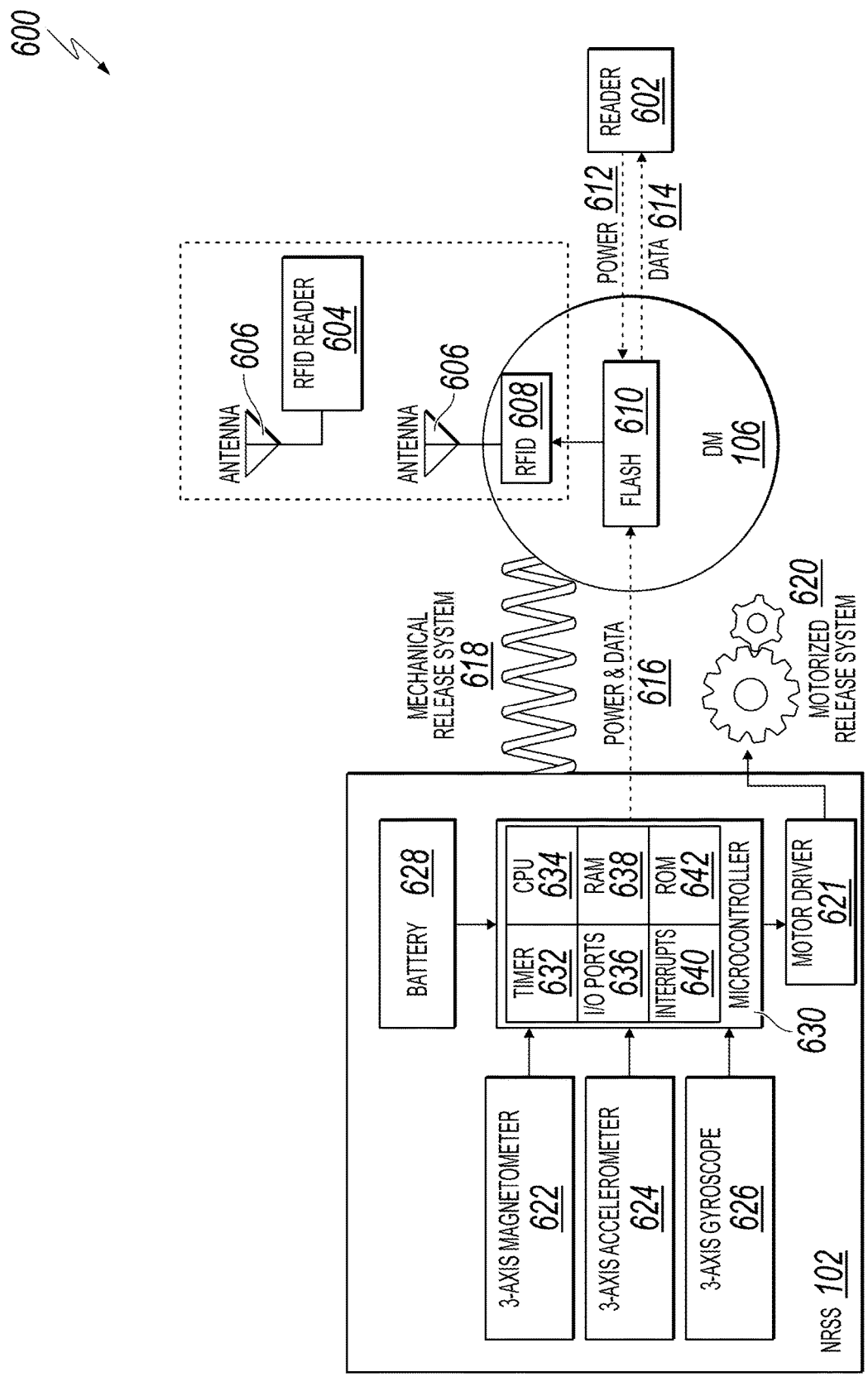
FIG. 6 is a system schematic showing an example relationship of the NRSS, the DM 106, and data readers, according to an implementation of the present disclosure.

FIG. 6 is a system schematic showing an example relationship of the NRSS 102, the DM 106, and data readers, according to an implementation of the present disclosure. The NRSS 102 and the DM 106 are both mechanically and electrically connected, for example, through the DM release groove 502. After the sensing data is collected by the NRSS 102 and passed (616) to the DM 106, the data saved in the DM 106 can either be downloaded by a wired reader 602 in a connected way (for example, providing power 612 and receiving data 614) or by a radio-frequency identification (RFID) reader 604 wirelessly, such as using antennas 606 and an RFID 608 in the DM 106 receiving information from a flash memory 610. RFID transmission distance can occur, for example, within one meter using 2.4 GHz frequency. However, this distance can be significantly improved by using low-frequency wireless transmissions, such as in KHz range, the range of the RFID transmission distance can be expected to reach a few meters and more. Wireless communications in downhole data transmission can use, for example, various technologies implemented to wirelessly connect MWD and RSS components in the mud.

The NRSS 102 can provide, for example, one or more of a mechanical release system 618 or a motorized release system 620 (for example, using motor driver 621). The NRSS 102 can include locational/movement components such as a 3-axis magnetometer 622, a 3-axis accelerometer 624, and a 3-axis gyroscope 626. The NRSS 102 can include components such as a battery 628, such as to power at least the motor driver 621, and a microcontroller 630 that includes a timer 632, a central processing unit (CPU) 634, input/output (I/O) ports 636, random access memory (RAM) 638, interrupts 640, and read-only memory (ROM) 642.

Data can be transferred from the main computing/controller board of the NRSS 102 to the DMs 106 while taking a survey. Depending on the resolution of the survey and a number of sensors involved in a specific case, a mechanical NRSS 102 or a motorized NRSS 102 can be used. For low-resolution surveys and less sensor-intense applications, for example, a mechanical NRSS 102 can be ideal due to being less complex and more power efficient. The system can be developed to ensure a sufficient data transfer rate that allows the data writing from the NRSS 102 to the DMs 106 to be completed before the mechanical release of the DMs 106. For high-resolution surveys and sensor-intense applications, a motorized NRSS 102 may be preferred. In this case, DMs 106 can be released based on a pre-determined time or based on external triggering signals, which can assure the completion of the data writing to the DMs 106 before the release.

In some implementations using a battery-less DM 106, the RFID reader 604 can query the flash memory 610 wirelessly. Battery-less RFID tagging is normally referred as passive RFID, while battery-powered tagging is referred as active RFID. In various implementations of the NRSS, DMs can be with or without an onboard battery. Battery-less DMs can operate in a passive RFID mode, where transmission distance and transmission rate are limited. For battery-powered DMs, antennas and transmitters can be integrated and powered by a battery on the PCB board, which can enable wireless data transfer to a surface base station at a greater distance when passing by.

Data from the DMs 106 can be read using standard computers, mobile devices, and/or other computers running appropriate software/applications to gather, process, and display information. The software/applications can include two major modules/interfaces, an NRSS module and a DM module. The NRSS module can be used to configure the NRSS to enable the required sensors for the job and set sensing parameters such as sensor resolution, sampling rate, and sampling time. In addition, the NRSS module can also be used to set DM releasing modes and strategy for motorized NRSS. For example, when the NRSS 102 is configured to release DMs 106 based on a time delay, the delay time and the number of DMs 106 to release for each batch can be preset on the NRSS 102 through the software. In another example, when the NRSS 102 is configured to release DMs 106 based on the tool inclination, then the inclination angle and the number of DMs 106 to release for each batch can be preset on the NRSS 102 through the software. When/if the NRSS 102 is retrieved after the job, the NRSS module can also be used to download the sensor data stored on board the NRSS 102. The DM module can be used for downloading the sensor data stored on the DMs 106.

Various hardware, software and connections can be used to program the NRSS microcontroller. For example, when communicating with the NRSS 102, the computer or mobile device can be connected with NRSS 102 using wired cable and communication protocols such as USB, serial, I2C, SPI, 1-wire, or in other ways. When communicating with DMs 106, for battery-less DMs 106, the computer or mobile device can be connected to the DM 106 using wired cable and communication protocols such as USB, serial, I2C, SPI, 1-wire, or in other ways. For battery-powered DMs 106 with antennas, wireless communications such as Bluetooth, WIFI, Zigbee, or near-field communication (NFC), Z-wave can be used to download data from DM 106.

In some implementations, the NRSS 102 can also store data itself that can be retrieved once the NRSS 102 is pulled from a well. The data that is saved on the NRSS 102 can be the same type of data saved in DMs 106 but with higher resolution. Data download can be done through grooves once the NRSS 102 is pulled out of the well.

Figure 7:
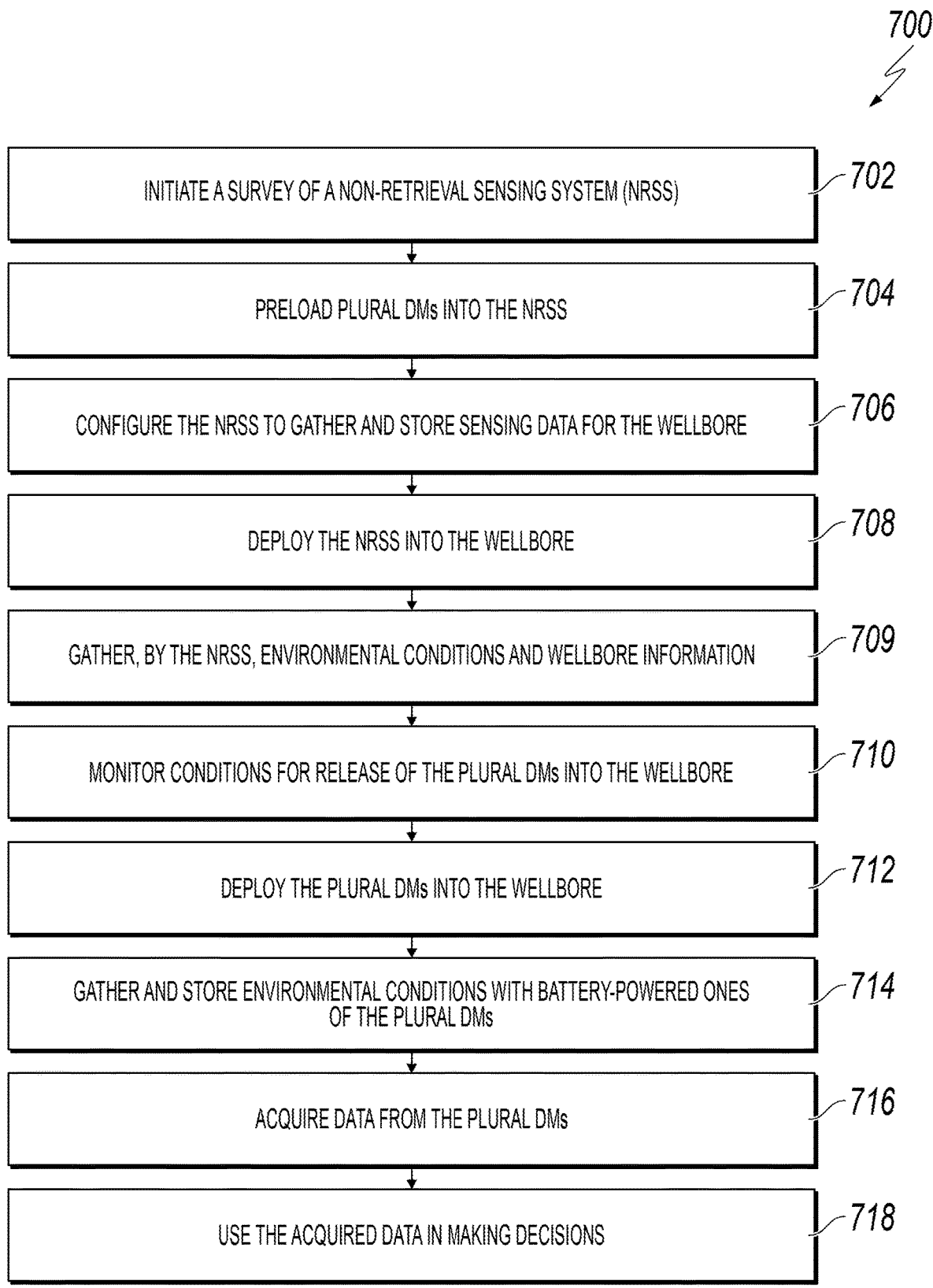
FIG. 7 is a flowchart illustrating an example method for using a non-retrieval sensing system in a wellbore, according to an implementation, according to an implementation of the present disclosure.

FIG. 7 is a flowchart of an example method 700 for using a non-retrieval sensing system in a wellbore, according to an implementation of the present disclosure. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order.

At 702, a survey of the NRSS is initiated. For example, an NRSS 102 can be identified for dropping into a wellbore during drilling of an oil well. In some instances, an operator at the well site can perform actions to ready the NRSS 102 for deployment, such as enabling battery power for the NRSS 102 and providing settings for the NRSS 102 so that ultimate retrieval of data from DMs 106 deployed by the NRSS 102 can occur. From 702, method 700 proceeds to 704.

At 704, plural DMs are pre-loaded into the NRSS. For example, the NRSS 102 can have plural DMs 106 pre-loaded at a factory, or the DMs 106 can be loaded on site, with the number of DMs 106 determined by requirements of the survey. The requirements can depend, for example, on a current or an expected depth of the wellbore, the type of information that is desired, and other requirements. In some implementations, DMs 106 can be configured for different types of data measurements and can be loaded into an NRSS 102 based on a particular data needs. From 704, method 700 proceeds to 706. The DMs 106 can be preloaded into the NRSS 102 from the open side of the release groove 502. The dimensions of the DMs 106 and the inner dimension of the release grooves 502 can be designed with proper tolerances to help assure that the DMs 106 maintain their positions in the NRSS 102.

At 706, the NRSS 102 is configured to gather and store sensing data for the wellbore. For example, technicians can configure the NRSS 102 for surveying the wellbore by identifying intervals at which the DMs 106 are to be deployed. From 706, method 700 proceeds to 708.

At 708, the NRSS 102 is deployed into the wellbore. For example, the NRSS 102 can be placed into the wellbore for which the survey is to occur. From 708, method 700 proceeds to 709.

At 709, environmental conditions and wellbore information are gathered by the NRSS 102. For example, as the NRSS 102 serves as the major (or only) carrier for on-board sensors, the NRSS 102 can gather information before each of the DMs 106 is deployed, as well as after deployment. From 709, method 700 proceeds to 710.

At 710, conditions are monitored for release of the DMs 106 into the wellbore. For example, release conditions can include depth (such as counting vibrations from making joints), depth based on the well inclination, temperature, gamma ray reading, and other factors. For example, depth and time interval information preloaded into the NRSS 102, as well as information gathered by sensors of the NRSS 102 during its descent, can be used for monitoring the release of the DMs 106 over time. From 710, method 700 proceeds to 712.

At 712, the DMs 106 are deployed into the wellbore. For example, plural DMs 106 can be deployed, such as at different intervals and/or at the bottom of the wellbore, through the release grooves of the NRSS 102 inside a wellbore during the survey and/or during drilling of a well. From 712, method 700 proceeds to 714.

At 714, environmental conditions are gathered and stored by battery-powered ones of the DMs 106. Battery-powered DMs 106, for example, can collect information with on-board sensors within the wellbore. The NRSS 102 is not required at this time to do any further transmission or sensing. Step 714 can be optional, as using DMs 106 that are battery-powered and include sensors can be optional. For example, in some implementations, the sole purpose of DMs 106 can be to be deployed from the NRSS 102 and deliver information to the surface. From 714, method 700 proceeds to 716.

At 716, data is acquired from the DMs 106. For example, a reader at the top of the wellbore can receive the data through a low frequency transmission or when the DMs 106 float to top and the data is read by a wireless sensor, or the data can be retrieved or downloaded in some other way. From 716, method 700 proceeds to 718.

At 718, the acquired data is used in making decisions. For example, technicians at the well site or in other locations can use the information to learn about conditions of the wellbore, and the technicians can use the information to make decisions, such as whether or how to continue drilling. From 718, method 700 stops.

Figure 8:
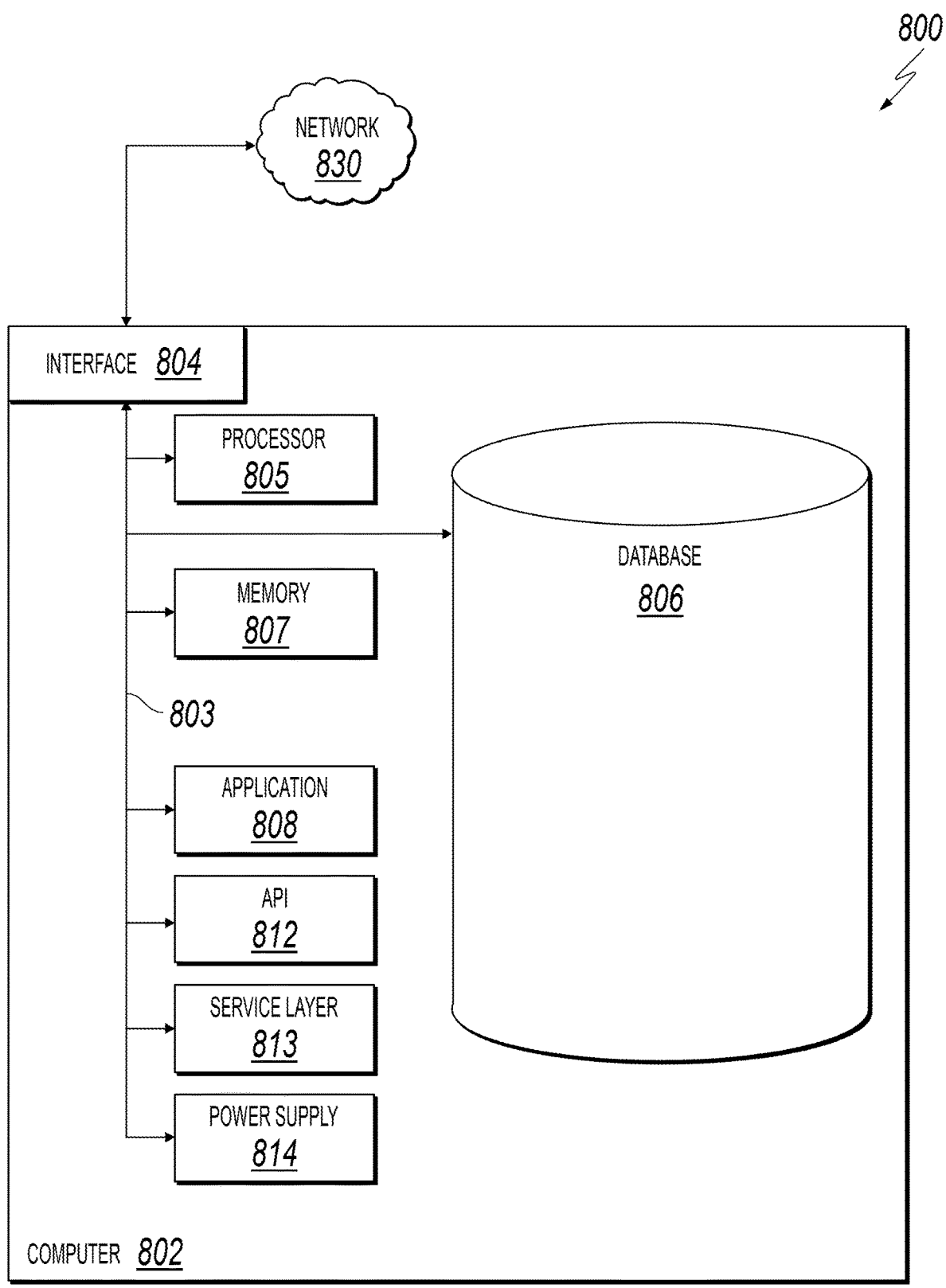
FIG. 8 is a block diagram illustrating an example computer system used to provide computational functionalities associated with described algorithms, methods, functions, processes, flows, and procedures as described in the instant disclosure, according to an implementation of the present disclosure.

FIG. 8 is a block diagram of an example computer system 800 used to provide computational functionalities associated with described algorithms, methods, functions, processes, flows, and procedures, as described in the instant disclosure, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a graphical user interface (GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, or other server (or a combination of servers).

The computer 802 can receive requests over network 830 from a client application (for example, executing on another computer 802) and respond to the received requests by processing the received requests using an appropriate software application(s). In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 comprises logic encoded in software or hardware (or a combination of software and hardware) and is operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). Memory 807 can store any data consistent with this disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power-supply 814 can include a power plug to allow the computer 802 to be plugged into a wall socket or other power source to, for example, power the computer 802 or recharge a rechargeable battery.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

Described implementations of the subject matter can include one or more features, alone or in combination.

For example, in a first implementation, a computer-implemented system comprises: a non-retrieval sensing system (NRSS) comprising: at least one hardware processor interoperably coupled with computer memory and configured to perform operations of one or more components of the computer-implemented system; and a detachable module (DM) delivery system configured to deploy, from release grooves of the NRSS and during a survey of the NRSS inside a wellbore during drilling of a well, plural DMs into an environment surrounding the NRSS, wherein the plural DMs are pre-loaded into the NRSS; and plural DMs configured to gather and store sensing data from the environment The foregoing and other described implementations can each, optionally, include one or more of the following features:

A first feature, combinable with any of the following features, the system further comprises a reader separate from the NRSS and configured to read the data captured by the DMs without requiring recovery of the NRSS.

A second feature, combinable with any of the previous or following features, the DM delivery system includes a mechanical release system that includes a spring encased in a housing of the NRSS, the spring configured to cause deployment of the plural DMs using inertial motion of the NRSS when the NRSS reaches a stopping point the survey of the NRSS.

A third feature, combinable with any of the previous or following features, the DM delivery system includes a motorized release system that includes a motor encased in a housing of the NRSS, the motor configured to engage a rack to deploy the plural DMs at different intervals during the survey of the NRSS, the NRSS including a battery for powering the motor.

A fourth feature, combinable with any of the previous or following features, the NRSS has a pipe-shaped design that, allows fluid to flow through the center.

A fifth feature, combinable with any of the previous or following features, the DM includes: a printed circuit board including a microcontroller configured for controlling the DM, including controlling communication with the NRSS and with external systems to which the DM provides data; storage chips for storing sensor information; and electrodes for engaging powered contacts in the release grooves of the NRSS.

A sixth feature, combinable with any of the previous or following features, the NRSS includes: locational/movement components including a 3-axis magnetometer, a 3-axis accelerometer, and a 3-axis gyroscope; and a microcontroller configured to control the NRSS and including a timer, a central processing unit (CPU), input/output (I/O) ports, random access memory (RAM), interrupts, and read-only memory (ROM); and wherein the microcontroller determines the different intervals using information from at least one of the locational/movement components and the timer.

A seventh feature, combinable with any of the previous or following features, the DM has a shape that is spherical, cylindrical, ellipsoid, or capsule.

An eighth feature, combinable with any of the previous or following features, the DM further includes integrated sensors including temperature sensors, pressure sensors, magnetic field sensors, gamma ray sensors, acoustic sensors, spectroscopic sensors, chemical sensors, and Potential of Hydrogen (PH) sensors.

A ninth feature, combinable with any of the previous or following features, the DM further includes a radio-frequency identification (RFID) configured for communication of data with an RFID reader external to the DM.

A tenth feature, combinable with any of the previous or following features, the wellbore is a wellbore of an onshore oil well, an offshore oil well, an onshore gas well, or an offshore gas well.

In a second implementation, a computer-implemented method comprises initiating a survey of a wellbore using a NRSS; preloading plural DMs into the NRSS; configuring the NRSS to gather and store sensing data for the wellbore; deploying the NRSS into the wellbore; gathering and storing environmental condition or wellbore information using NRSS; monitoring conditions for release of the plural DMs into the wellbore; deploying the plural DMs into the wellbore; gathering and storing environmental conditions using battery-powered ones of the plural DMs; acquiring data from the plural DMs; and using the acquired data for making operational decisions.

The foregoing and other described implementations can each, optionally, include one or more of the following features:

A first feature, combinable with any of the following features, the computer-implemented method further comprises gathering and storing environmental conditions using plural battery-powered DMs.

A second feature, combinable with any of the previous or following features, deploying the plural DMs includes using a mechanical release system that includes a spring encased in a housing of the NRSS, the spring configured to cause deployment of the plural DMs using inertial motion of the NRSS when the NRSS reaches a stopping point the survey of the NRSS.

A third feature, combinable with any of the previous or following features, deploying the plural DMs includes using a motorized release system that includes a motor encased in a housing of the NRSS, the motor configured to engage a rack to deploy the plural DMs at different intervals during the survey of the NRSS, the NRSS including a battery for powering the motor.

A fourth feature, combinable with any of the previous or following features, the DM includes: a printed circuit board including a microcontroller configured for controlling the DM, including controlling communication with the NRSS and with external systems to which the DM provides data;

storage chips for storing sensor information; and electrodes for engaging powered contacts in release grooves of the NRSS.

A fifth feature, combinable with any of the previous or following features, the NRSS includes: locational/movement components including a 3-axis magnetometer, a 3-axis accelerometer, and a 3-axis gyroscope; and a microcontroller configured to control the NRSS and including a timer, a central processing unit (CPU), input/output (I/O) ports, random access memory (RAM), interrupts, and read-only memory (ROM); and wherein the microcontroller determines the different intervals using information from at least one of the locational/movement components and the timer.

A sixth feature, combinable with any of the previous or following features, the DM has a shape that is spherical, cylindrical, ellipsoid, or capsule.

A seventh feature, combinable with any of the previous or following features, the DM further includes integrated sensors including temperature sensors, pressure sensors, gamma ray sensors, acoustic sensors, spectroscopic sensors, chemical sensors, and Potential of Hydrogen (PH) sensors.

An eighth feature, combinable with any of the previous or following features, the DM further includes a radio-frequency identification (RFID) configured for communication of data with an RFID reader external to the DM.

A ninth feature, combinable with any of the previous or following features, the wellbore is a wellbore of an onshore oil well, an offshore oil well, an onshore gas well, or an offshore gas well.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (light emitting diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system, comprising:
a non-retrieval sensing system (NRSS) comprising:
at least one hardware processor interoperably coupled with computer memory and configured to perform operations of one or more components of the system; and
a detachable module (DM) delivery system configured to deploy, from release grooves of the NRSS and during a survey of the NRSS inside a wellbore during drilling of a well, plural DMs into an environment surrounding the NRSS; and
a plurality of DMs pre-loaded into the NRSS, each DM comprising integrated sensors and configured to:
gather, using the integrated sensors, sensing data from the environment; and
store the sensing data.

2. The system of claim 1, further comprising:
a reader separate from the NRSS and configured to read the data captured by the plurality of DMs without requiring recovery of the NRSS.

3. The system of claim 1, wherein the NRSS has a pipe-shaped design that allows fluid to flow through the center.

4. The system of claim 1, wherein each DM has a shape that is spherical, cylindrical, ellipsoid, or capsule.

5. The system of claim 1, wherein the integrated sensors further include at least one of temperature sensors, pressure sensors, magnetic field sensors, gamma ray sensors, acoustic sensors, spectroscopic sensors, chemical sensors, or Potential of Hydrogen (PH) sensors.

6. The system of claim 1, wherein each DM further includes a radio-frequency identification (RFID) configured for communication of data with an RFID reader external to the DM.

7. The system of claim 1, wherein the wellbore is a wellbore of an onshore oil well, an offshore oil well, an onshore gas well, or an offshore gas well.

8. A computer-implemented method, comprising:
initiating a survey of a wellbore using a NRSS;
preloading a plurality of DMs into the NRSS;
configuring the NRSS to gather and store sensing data for the wellbore;
deploying the NRSS into the wellbore;
gathering and storing environmental condition or wellbore information using NRSS;
monitoring conditions for release of the plurality of DMs into the wellbore;
deploying the plurality of DMs into the wellbore, wherein each DM comprises integrated sensors;
gathering, using the integrated sensors of at least one of the plurality of DMs, environmental conditions and storing the environmental conditions in the at least one of the plurality of DMs;
acquiring data from the plurality of DMs; and
using the acquired data for making operational decisions.

9. The computer-implemented method of claim 8, wherein deploying the plurality of DMs includes using a motorized release system that includes a motor encased in a housing of the NRSS, the motor configured to engage a rack to deploy the plural DMs at different intervals during the survey of the NRSS, the NRSS including a battery for powering the motor.

10. The computer-implemented method of claim 8, wherein each DM has a shape that is spherical, cylindrical, ellipsoid, or capsule.

11. The computer-implemented method of claim 8, wherein the integrated sensors include at least one of temperature sensors, pressure sensors, gamma ray sensors, acoustic sensors, spectroscopic sensors, chemical sensors, or Potential of Hydrogen (PH) sensors.

12. The computer-implemented method of claim 8, wherein each DM further includes a radio-frequency identification (RFID) configured for communication of data with an RFID reader external to the DM.

13. The computer-implemented method of claim 8, wherein the wellbore is a wellbore of an onshore oil well, an offshore oil well, an onshore gas well, or an offshore gas well.

14. A non-transitory computer-readable medium storing one or more instructions executable by a computer system to perform operations comprising:
initiating a survey of a wellbore using a NRSS;
preloading a plurality of DMs into the NRSS;
configuring the NRSS to gather and store sensing data for the wellbore;
deploying the NRSS into the wellbore;
gathering and storing environmental condition or wellbore information using NRSS;
monitoring conditions for release of the plurality of DMs into the wellbore;
deploying the plurality of DMs into the wellbore, wherein each DM comprises integrated sensors;
gathering, using the integrated sensors of at least one of the plurality of DMs, environmental conditions and storing the environmental conditions in the at least one of the plurality of DMs;
acquiring data from the plurality of DMs; and
using the acquired data for making operational decisions.

15. The non-transitory computer-readable medium of claim 14, wherein deploying the plurality of DMs includes using a mechanical release system that includes a spring encased in a housing of the NRSS, the spring configured to cause deployment of the plurality of DMs using inertial motion of the NRSS when the NRSS reaches a stopping point the survey of the NRSS.

16. The non-transitory computer-readable medium of claim 14, wherein deploying the plurality of DMs includes using a motorized release system that includes a motor encased in a housing of the NRSS, the motor configured to engage a rack to deploy the plurality of DMs at different intervals during the survey of the NRSS, the NRSS including a battery for powering the motor.

17. The non-transitory computer-readable medium of claim 14, wherein each DM includes:

a printed circuit board including a microcontroller configured for controlling the DM, including controlling communication with the NRSS and with external systems to which the DM provides data;

storage chips for storing sensor information; and electrodes for engaging powered contacts in release grooves of the NRSS.

18. The non-transitory computer-readable medium of claim 14, wherein the NRSS includes:

locational/movement components including a 3-axis magnetometer, a 3-axis accelerometer, and a 3-axis gyroscope; and a microcontroller configured to control the NRSS and including a timer, a central processing unit (CPU), input/output (I/O) ports, random access memory (RAM), interrupts, and read-only memory (ROM);

and wherein the microcontroller determines different intervals at which to deploy the plurality of DMs using information from at least one of the locational/movement components and the timer.

19. The non-transitory computer-readable medium of claim 14, wherein each DM has a shape that is spherical, cylindrical, ellipsoid, or capsule.

20. The non-transitory computer-readable medium of claim 14, wherein the integrated sensors include at least one of temperature sensors, pressure sensors, gamma ray sensors, acoustic sensors, spectroscopic sensors, chemical sensors, or Potential of Hydrogen (PH) sensors.

\* \* \* \* \*